Aug. 7, 1928.
R. V. PROCTOR
1,680,065
FOLDABLE SUPPORT
Filed Feb. 10, 1927    2 Sheets-Sheet 1
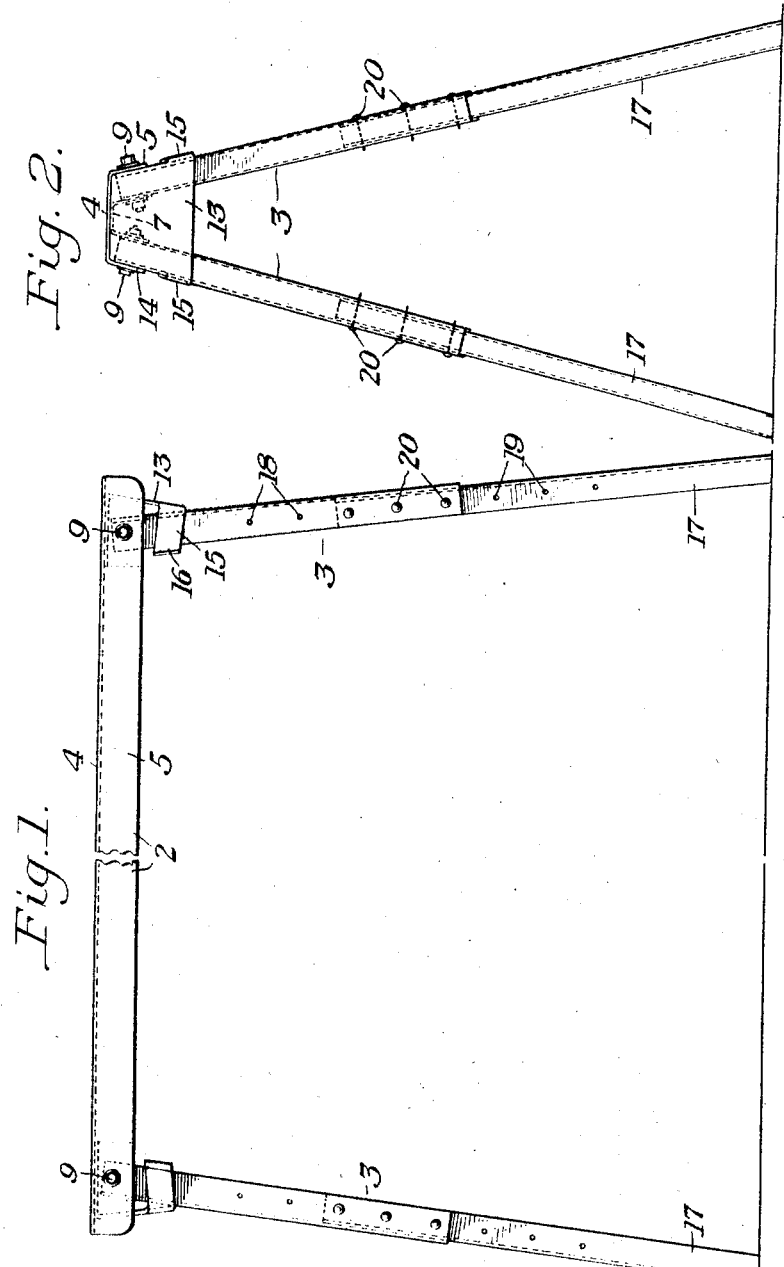
INVENTOR
Robert V. Proctor Aug. 7, 1928.
R. V. PROCTOR
1,680,065
FOLDABLE SUPPORT
Filed Feb. 10, 1927   2 Sheets-Sheet 2
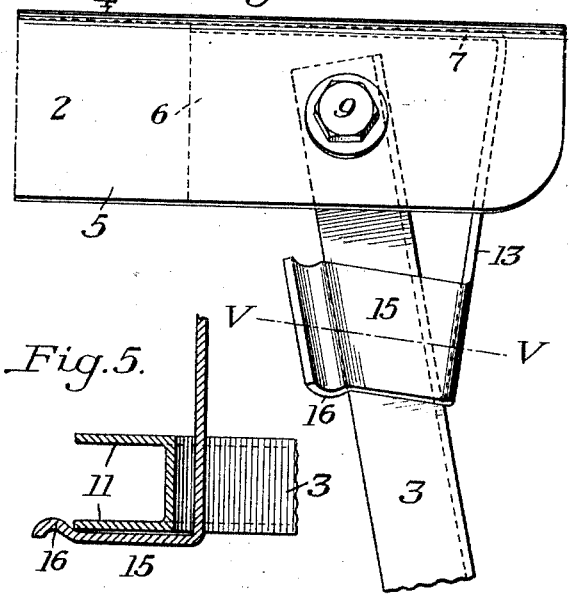
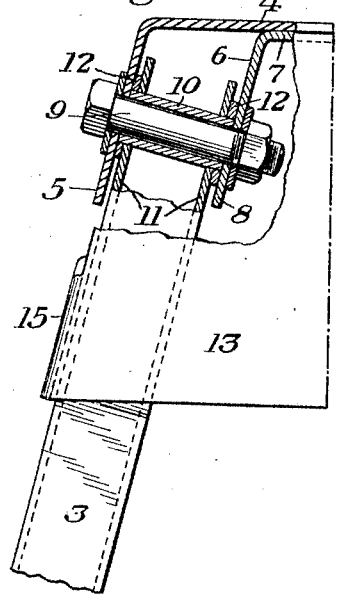
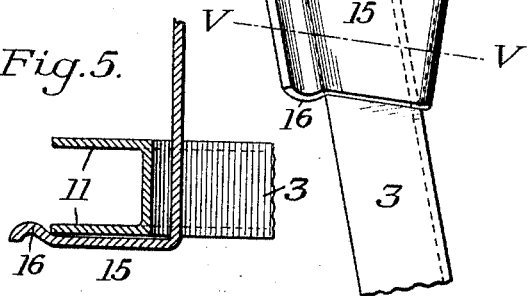
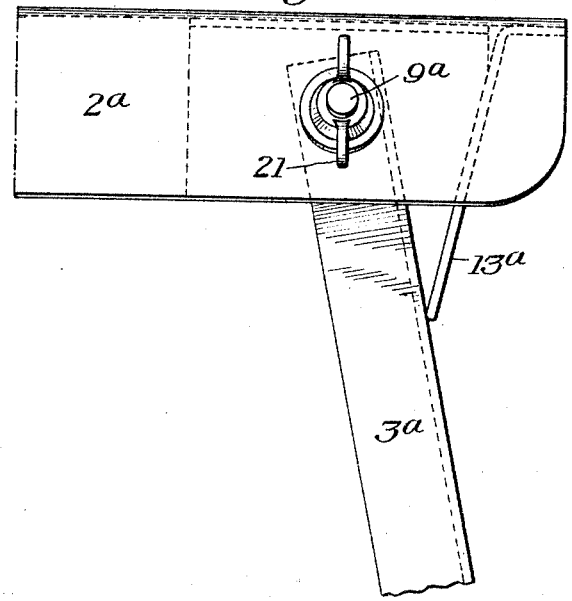
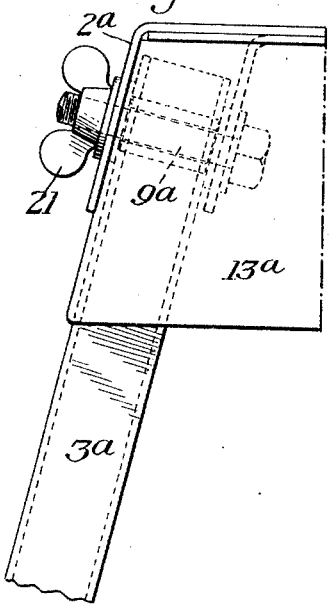
INVENTOR
Robert V. Proctor
by his atty Patented Aug. 7, 1928.

1,680,065

UNITED STATES PATENT OFFICE.

ROBERT V. PROCTOR, OF YOUNGSTOWN, OHIO, ASSIGNOR TO THE COMMERCIAL SHEARING & STAMPING COMPANY, OF YOUNGSTOWN, OHIO, A CORPORATION OF OHIO.

FOLDABLE SUPPORT.

Application filed February 10, 1927. Serial No. 167,166.

This invention relates to foldable supports, and is herein particularly described as applied to a saw horse such as used by carpenters, and other workmen.

I provide a foldable support which is simple and inexpensive to manufacture, and is strong and rigid in use. I preferably employ a frame made of a strip of metal with the sides bent downwardly to form flanges inclined to the working surface. I preferably place a member within the frame and spaced from the flanges and fit legs between the flanges and the member. Pivot pins are employed for the mounting of the legs. These pins are placed substantially perpendicular to the flanges so that the legs will fold into the body and lie alongside the flanges. Preferably, channel shaped legs are employed, the pivot pins extending through the flanges of the channels. At each end of the horse or support I preferably employ a buttress which limits the pivotal movement of the legs. Various means may be used for locking the legs in their extended position.

If desired, the legs may be made extensible by providing members which fit within the channels, these members, as well as the channels, being provided with openings through which pins may be placed.

In the accompanying drawings, which illustrate the present preferred embodiment of the invention and one modification thereof, Figure 1 is a side elevation of the preferred form, Figure 2 is an end view, Figure 3 is a side elevation to enlarged scale of a portion of the horse shown in Figures 1 and 2, Figure 4 is an end view partly broken away of the apparatus shown in Figure 3, Figure 5 is a horizontal section taken on the line V—V of Figure 3, Figure 6 is a view corresponding to Figure 3 but showing a modified structure, and Figure 7 is an end view of the apparatus shown in Figure 6.

Referring first to Figures 1 to 5 inclusive, there is shown a saw horse comprising a body 2 and legs 3. The body is made of a strip of metal bent to form an upper or working face 4 with inclined integral flanges 5.

Adjacent each end of the horse a member 6 is fitted inside the frame 2. This member 6 comprises a portion 7 (Figure 4) which is secured to the frame 2, as by welding, and downwardly extending flanges 8. The flanges 8 are substantially parallel to the flanges 5.

The legs 3 are mounted on pivot pins 9 which extend between the flanges 5 and 8. In this embodiment of the invention the pivot pins 9 take the form of bolts. These bolts are surrounded by sleeves 10. The legs 3 are channel shaped and their flanges 11 have holes formed therein to receive the sleeve 10. Washers 12 space the flanges 11 of the legs from the flanges 5 and 8. There is sufficient spring in the flanges 11 to offer some resistance to rotation of the legs 3 around the pivot pins.

A buttress 13 is provided adjacent each end of the horse. This buttress is made integral with the member 7. It is welded to the flanges 5 as indicated at 14 and provides a strong reinforcement. The buttress limits the pivotal movement of the legs and determines their working position. A springlike extension 15 is formed on each side of the buttress for engaging a leg 3. The extension 15 has a bead 16 at its end so that it acts as a latch and holds the leg in the desired position. When it is desired to fold the horse, the legs are pulled inwardly so as to snap over the bead 16. Continued rotation of the legs around the pivot pins brings them within the body or frame 2. The legs lie alongside the flanges 5. It will be seen that the legs 3 should not extend beyond the center of the horse when they are in folded position, as otherwise legs at opposite ends of the horse will interfere with one another. If desired, the legs may be specially shaped adjacent their bottom ends to permit of their lying alongside one another when in folded position, but I prefer to make separate extension portions. These portions are channel shaped and are indicated at 17. They fit snugly within the legs 3. The legs 3 are provided with spaced holes 18 and corresponding holes 19 are formed in the extensions 17. Pins 20 are employed to fasten the legs 3 and extensions 17 together. By placing the pins in different holes the horse may be adjusted to varying heights, as desired.

Figures 6 and 7 illustrate a modified structure wherein the pivot pins 9ᵃ are provided with thumb nuts 21. By tightening on the thumb nuts the legs 3ᵃ may be held in working or folded position, as desired. This does away with the latch 15 which is shown in the main embodiment of the invention. A buttress 13ª comprising a separate piece of metal welded within the end of the frame 2ª is employed.

I have illustrated a preferred embodiment of the invention and one modification thereof. It will be understood however, that the invention is not limited to the forms shown, as it may be otherwise embodied within the scope of the following claims.

I claim:—

1. A foldable support comprising a frame having a supporting face, a flange inclined thereto, a supporting member secured to the frame and spaced from the flange, a leg fitting between the flange and the member, and a pivot pin for the leg extending from the flange to the member.

2. A foldable support comprising a channel-like body portion, a buttress fitted between the flanges of the channel so as to reinforce the same, a supporting member secured to the body portion and lying between the flanges thereof, a leg fitting between a flange and the supporting member, and a pivot pin for the leg extending from the flange to the supporting member, the leg being adapted to lie against the buttress when in its operative position.

3. A foldable support comprising a channel-like body portion, a buttress fitting between the flanges of the channel so as to reinforce the same, a pivot pin carried by the channel-like body portion, a leg directly mounted on the pivot pin and adapted to lie against the buttress and a spring actuated latch on the buttress for locking the leg in place.

In testimony whereof I have hereunto set my hand.

ROBERT V. PROCTOR.